United States Patent
Konishi et al.

[11] Patent Number: 6,130,996
[45] Date of Patent: *Oct. 10, 2000

[54] APPARATUS CAPABLE OF USING A FILM CARTRIDGE CONTAINING A LEAD PORTION OF A FILM WHICH IS FED OUT BY THE FILM THRUSTING OPERATION

[75] Inventors: Yoshito Konishi, Sakai; Yoshiyuki Inoue, Izumi; Hisanori Itoh, Sakai; Yushi Nobumoto, Amagasaki, all of Japan

[73] Assignee: Minolta Co., Ltd., Osaka, Japan

[ * ] Notice: This patent is subject to a terminal disclaimer.

[21] Appl. No.: 08/831,348

[22] Filed: Apr. 1, 1997

[30] Foreign Application Priority Data

Apr. 2, 1996 [JP] Japan .................................. 8-106346

[51] Int. Cl.<sup>7</sup> ...................................................... G03B 1/00
[52] U.S. Cl. ........................... 396/395; 396/406; 396/408; 396/409
[58] Field of Search ..................... 396/387, 397, 396/395, 406, 407, 408, 409, 410

[56] References Cited

U.S. PATENT DOCUMENTS

| | | | |
|---|---|---|---|
| 4,914,462 | 4/1990 | Pagano | 396/396 |
| 4,947,197 | 8/1990 | Smart et al. | 356/390 |
| 5,166,715 | 11/1992 | Labaziewicz | 396/406 |
| 5,235,365 | 8/1993 | Takatori et al. | 396/406 |
| 5,255,034 | 10/1993 | Shimada et al. | 396/406 |
| 5,300,975 | 4/1994 | Kunishige | 396/410 |
| 5,521,667 | 5/1996 | Egawa et al. | 396/407 |
| 5,548,363 | 8/1996 | Ohtsuka | 396/409 |
| 5,659,830 | 8/1997 | Cocca | 396/392 |
| 5,797,053 | 8/1998 | Tanaka | 396/397 |

FOREIGN PATENT DOCUMENTS

| | | |
|---|---|---|
| 04324432A | 11/1992 | Japan . |
| 05005939A | 1/1993 | Japan . |
| 05249549A | 9/1993 | Japan . |
| 07084301A | 3/1995 | Japan . |

*Primary Examiner*—Eddie C. Lee
*Attorney, Agent, or Firm*—Burns, Doane, Swecker & Mathis, LLP

[57] ABSTRACT

An apparatus capable of using a film cartridge in a manner that a lead portion of a film contained in the cartridge is fed out therefrom by the film thrusting, wherein a controller judges that an initial loading is not executed normally when a perforation is not detected although a fed film amount on an initial loading reaches a first predetermined amount, and stops a detector from detecting a perforation until the fed film amount reaches a second predetermined amount which is less than the first. Thus, a detector does not wrongly detect a notch on a film's lead portion as a perforation, and a leading frame is fed normally with a reliable judgment on an initial loading.

30 Claims, 10 Drawing Sheets

APPARATUS CAPABLE OF USING A FILM CARTRIDGE CONTAINING A LEAD PORTION OF A FILM WHICH IS FED OUT BY THE FILM THRUSTING OPERATION

BACKGROUND OF THE INVENTION

1. Field of the Invention

The present invention relates to an apparatus capable of using a film cartridge wherein a film is contained in a cartridge and a lead portion of the film is thrust and fed out of the cartridge.

2. Description of the Prior Art

Conventionally, a camera has been provided wherein such a film cartridge of a thrusting system is employed. Before the film cartridge is loaded in a camera body, the whole film including a lead portion of the film is contained in the cartridge, and when an initial loading is executed, which is done on a film loading in a camera body, a shaft of the film is driven, a lead portion of the film is thrust (film thrusting operation), and it is fed out to a leading film frame with being wound up around a winding spool. A perforation is formed on the film corresponding to each of a film frame so that each of a film frame is fed to an appropriate position for photographing, and a sensor for detecting the perforation is arranged on a camera body.

In a camera capable of using such a film cartridge of a thrusting system, it is able to control so that the leading first film frame exactly stops at a normal position by a perforation detection when an initial loading is executed.

Moreover, in a camera capable of using such a film cartridge of a thrusting system, it is able to use a used film cartridge by loading it again on a camera and feeding to a position of an unexposed frame after the film is rewound in its halfway such that not all frames are photographed (exposed). Rewinding a camera in such a way, the whole film including its lead portion is contained in the cartridge.

According to the U.S. Pat. No. 4,947,197 gazette, a film has to be wound around a flanged bobbin which is disposed inside of a cartridge in order that its lead portion can be fed out of the cartridge by thrusting, and the lead portion has to be projected out of the circumference of a flange so as to make it able to use a rewound film. Therefore, a notch is formed on a lead portion of a film, and ahead of notch is kept being projected out of the circumference of a flange.

As mentioned above, if a film having a notch on its leading portion is loaded on a camera that detects a perforation in order to detect a leading first film frame, the notch may be wrongly detected as a perforation, which may cause a failure of an initial loading.

Moreover, in such a camera capable of using the above-mentioned film cartridge, there is a case that an initial loading operation which should be executed by a film feeding mechanism on loading a cartridge in the camera, can not be executed (a failure of film thrusting) due to some condition. In such a case, a sequence for rewinding and taking out the film cartridge may be executed so as to proceed to a re-initial loading. When a perforation is not detected by a perforation detection sensor although an amount of fed film reaches a prescribed amount after starting an initial loading, it may be judged that the initial loading is not executed normally. This is a method for judging whether the initial loading is executed normally or not.

However, as a notch is formed on its lead portion in order to execute a thrusting operation, if a perforation detection function is designed to be executed soon after starting an initial loading, and judge whether the initial loading is executed normally or not, the notch of the film may be wrongly detected as a perforation. In such a case, a leading frame is not fed normally.

A perforation detection sensor can be designed to detect the notch and perforation both, and judge a second detection signal to be the signal of a first perforation. However, even in such a design, when a lead portion of a film is close to a perforation detection sensor, a film is not yet positioned and guided exactly in a width direction, so that a notch may not be detected.

A perforation detection sensor can be arranged so as to detect only the perforation, without detecting the notch, by making use of a difference between positions of the notch and perforation. Even in such a case, however, as a lead portion of a film is not yet positioned in a width direction at the moment, a perforation detection sensor may detect a notch and a perforation both.

SUMMARY OF THE INVENTION

The present invention is made to solve the above-mentioned problems, and an object of the present invention is to provide an apparatus which can give a reliable judgment on an initial loading without wrongly detecting a notch on a film thrusting operation as a perforation, and then feed a leading frame normally.

Further object of the present invention is to provide an apparatus which can take some appropriate measure when an initial loading is not executed normally, which is executed on a film cartridge loading in a camera.

According to one aspect of the present invention, an apparatus wherein a film is contained in a cartridge and a lead portion of the film is thrust and fed out of cartridge comprises; a film feeder which executes an initial loading to feed a leading frame by thrusting a lead portion of a film out of a film cartridge loaded in a camera body and winding up a film around a winding spool, a perforation detector which detects a perforation formed on a film for a frame feeding, and a controller which stops a perforation detector from detecting a perforation until a fed film amount for an initial loading reaches a predetermined amount.

In the above-mentioned constructions, a film feeder executes an initial loading to feed a leading frame by thrusting a lead portion of a film out of a film cartridge loaded in a camera and winding up a film around a winding spool, a perforation detector detects a perforation formed on a film for a frame feeding, and a controller stops a perforation detector from detecting a perforation until a fed film amount for an initial loading reaches a predetermined amount. As a result, the controller prevents the detector from wrongly detecting a notch on a film for a film thrusting operation as a perforation.

DETAILED DESCRIPTION OF THE PREFERRED EMBODIMENTS

Figure 1:
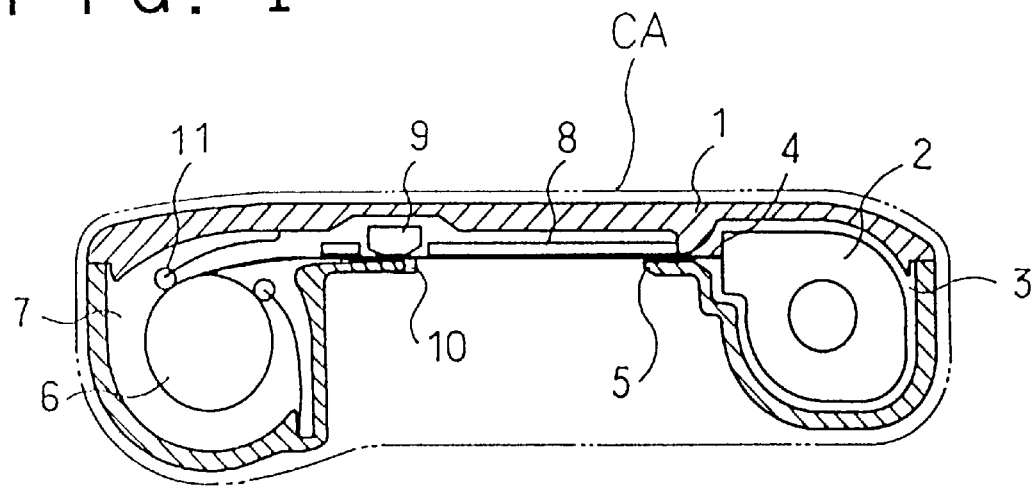
FIG. 1 is a schematic horizontal sectional view of a camera of the first embodiment.

Now, a first embodiment of the present invention will be explained referring to the drawings from FIG. 1 to FIG. 13.

FIG. 1 is a schematic horizontal sectional view of a camera in the first embodiment. A camera body 1 of the camera CA comprises a cartridge chamber 3 where a film cartridge 2 is loaded, a photographing frame 5 having an aperture where a film 4 is fed and an image is formed by exposing, a spool chamber 7 where a winding spool 6 is disposed, and the like. A pressure plate 8 is arranged behind the film 4 at the photographing frame 5, and a magnetic head 9 and a pad 10 are arranged at a downstream side in the film winding up direction, and a film roller 11, which presses the film 4 wound up to the winding spool 6, is arranged in the spool chamber 7. A photographing lens (not shown) and the like are arranged at the photographing frame frontward of the camera. Further, a cover case (shown in a chain line) surrounds the camera body 1.

Figure 2:
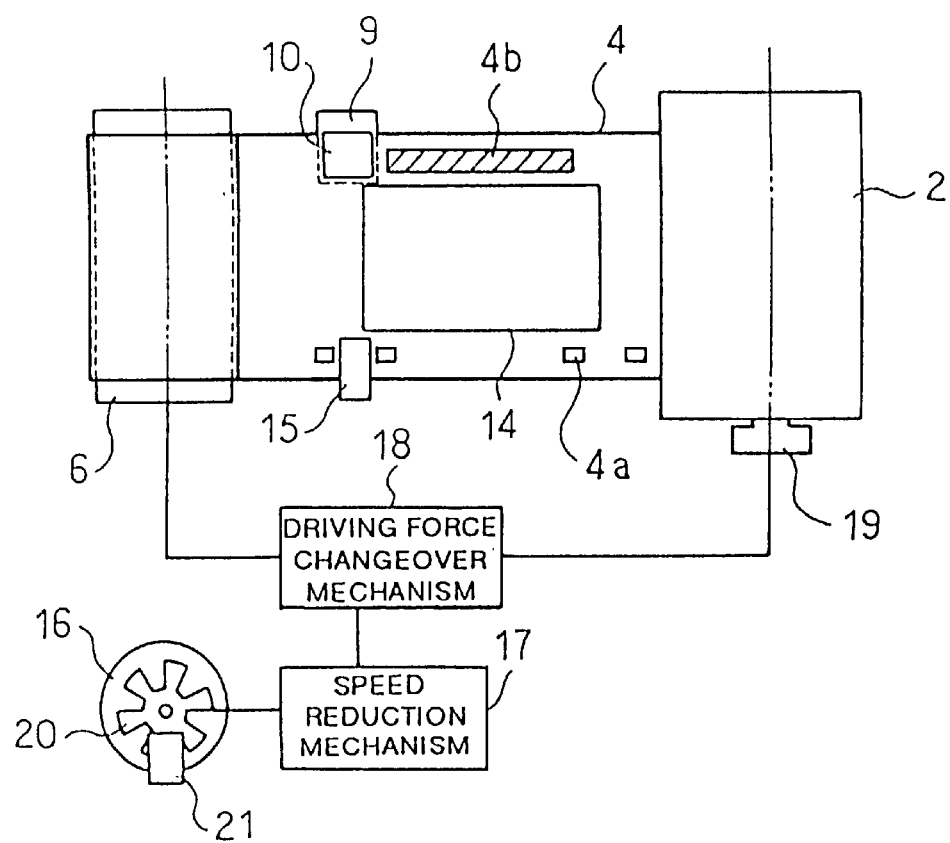
FIG. 2 is a view showing a structure of film feeding system of the camera.

FIG. 2 shows a structure of a film feeding system of the camera. As shown in the figure, a perforation 4a is disposed on the film 4 so as to correspond to a position of each film frame, and a perforation sensor 15, which counts the perforation 4a on the fed film 4 optically, is arranged on the camera. Further, a magnetic recording section 4b (track) is arranged behind the film 4 so as to correspond to a position of the magnetic head 9 and each frame 14. Moreover, a feeding motor 16 is arranged for feeding and rewinding the film 4, and its output is connected with the winding spool 6 and a winding fork 19 through a speed reduction system 17 and a driving force changeover mechanism 18. Furthermore, a blade wheel 20 and a motor rotation amount sensor 21 are arranged in order to detect an amount of rotation of the feeding motor 16.

Figure 3:
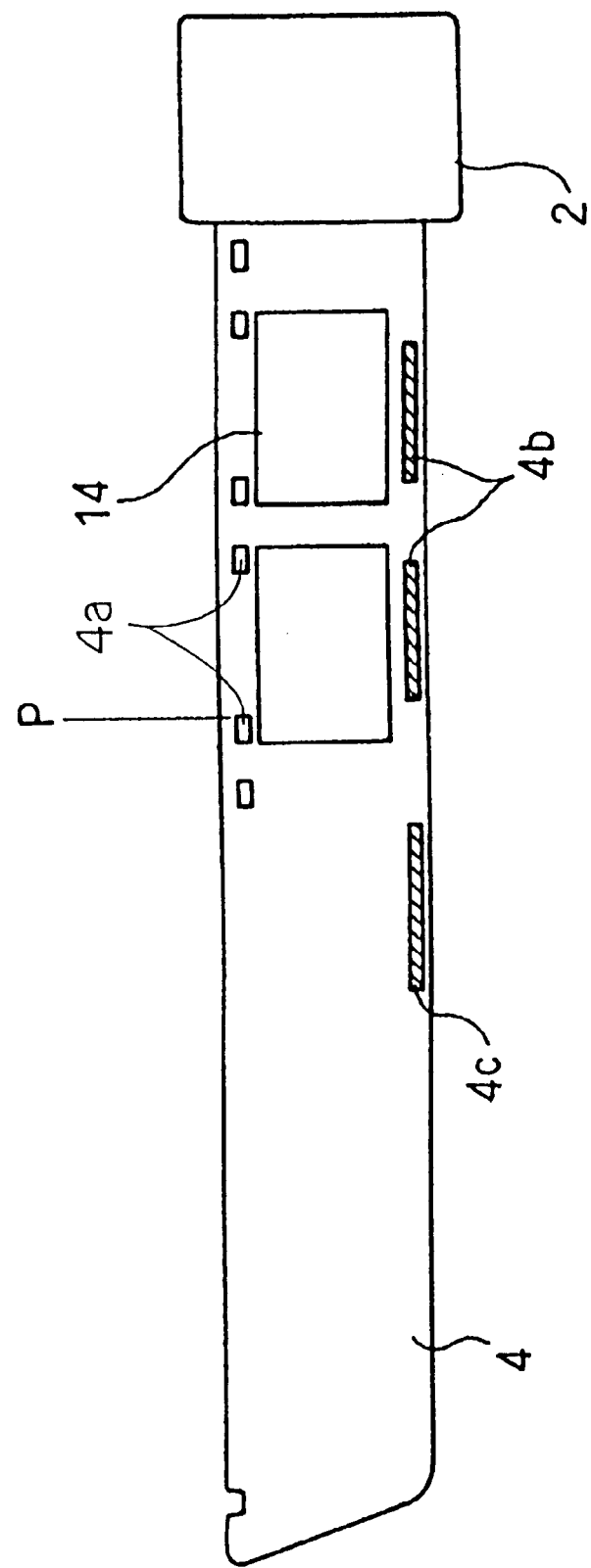
FIG. 3 is a schematic constructional view showing a state that a lead portion of a film of a film cartridge, which is used in the camera, is fed out.

FIG. 3 is a schematic structure showing a state that a lead portion of a film of a film cartridge, which is employed in the present camera, is fed out. In a film cartridge before loading in the camera, the film 4 is contained in the cartridge 2 completely, and when it is loaded in the camera and an initial loading is executed for conveying a film to a winding spool, a lead portion of the film 4 is thrust by a rotation drive of a shaft where the film 4 is wound (film thrusting operation), and it is conveyed out of the cartridge 2. On the film 4, a perforation 4a is arranged at both sides of a film frame 14 correspondingly, and the film 4 is positioned for the photographing frame 5 of the camera (FIG. 1) based on an edge "P" of the perforation 4a, which corresponds to each film frame, and a film frame 14 is exposed. Further, on a magnetic track 4c disposed on a lead portion of a film, a lead portion magnetic recording data, which is a common data in the film, is recorded, and on the magnetic track 4b disposed correspondingly to the each frame 14, a frame data, which corresponds to each frame, is recorded.

Figure 4:
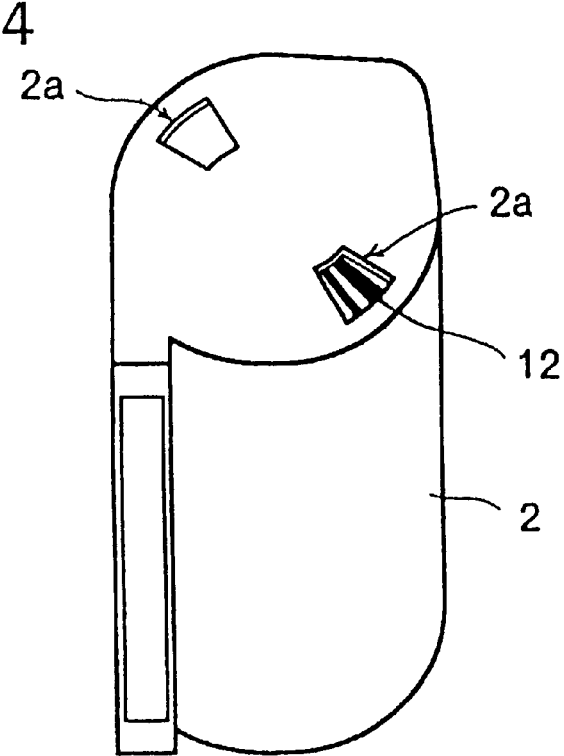
FIG. 4 is a perspective view of a film cartridge.
Figure 5:
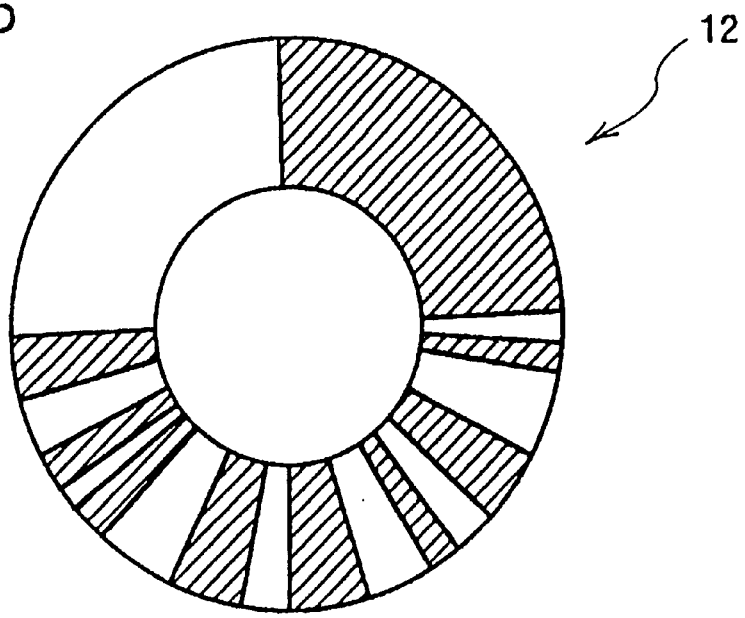
FIG. 5 is a top view of an indication means.

In the cartridge 2, an indicator is disposed, wherein it indicates an exposure condition of a film (unexposed, partially exposed, entirely exposed, developed, and so on) and a cartridge data. In order to indicate such a information, for example, as shown in FIG. 4 and FIG. 5, a bar code plate 12, which rotates with a film winding spool of the film cartridge, is disposed at an end plane of the cartridge 2, and a bar code which is shown at an indication window 2a of the cartridge 2, indicates a cartridge data such as a kind of a film, a film sensitivity a fixed number of film frame and the like. At the same time, an indicator may be employed, which indicates an exposure condition based on a position where the film winding spool is stopped. Further, on the camera body, a pair of bar code sensors 34 and 35 (FIG. 7), which read out the bar code, are arranged at a different rotation phase.

Figure 6:
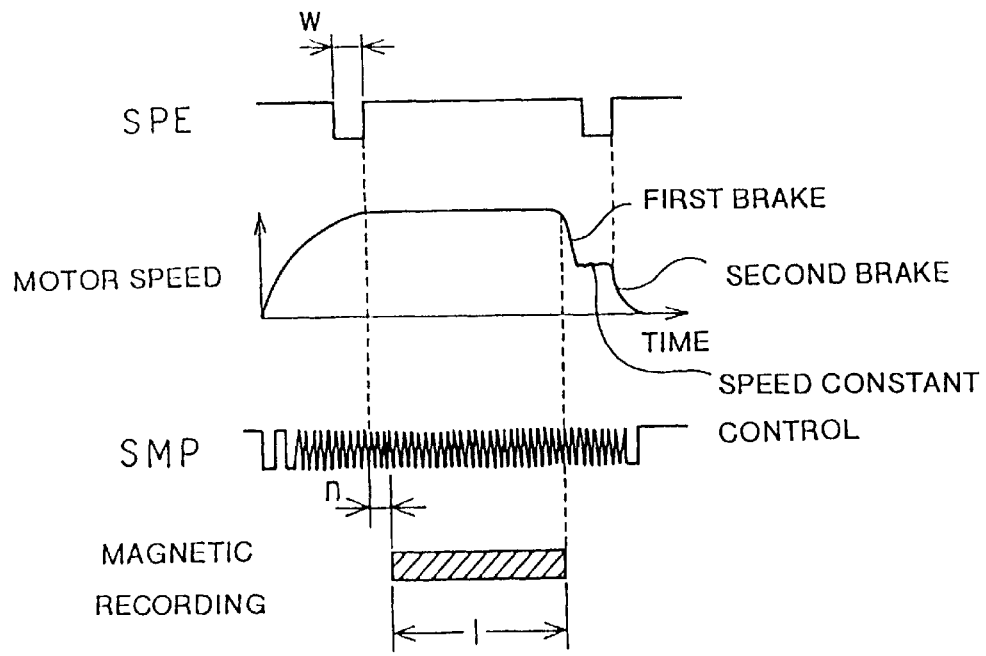
FIG. 6 is a time chart of one frame rewinding operation.

FIG. 6 is a time chart of one film frame winding up operation. SPE is a detected signal of the perforation 4a by the perforation sensor 15 and SMP is a motor pulse signal of a motor rotation amount sensor 21 in the motor 16. As shown in the figure, after counting a predetermined pulse (n) of the motor pulse SMP from a first leading edge of the perforation signal SPE, a magnetic recording is started. A feeding speed by the feeding motor 16 is calculated by monitoring a width (time) of the motor pulse signal SMP just before a magnetic recording or monitoring a width (w) of the first pulse of the perforation signal SPE. As amount of data to be recorded magnetically is predetermined, a frequency of a magnetic recording signal for recording all data on a length (l) is decided when a feeding speed is in a predetermined value. Here, a magnetic recording scope (l) is made to be contained within a predetermined length of one frame. After a magnetic recording is completed, the motor 16 is put on a first brake and reduces its speed once, and then controls so as to keep a regular speed by means of PWM and the like, then put on a second brake and stop the film feeding when a second leading edge of the perforation sensor signal SPE is detected.

Figure 7:
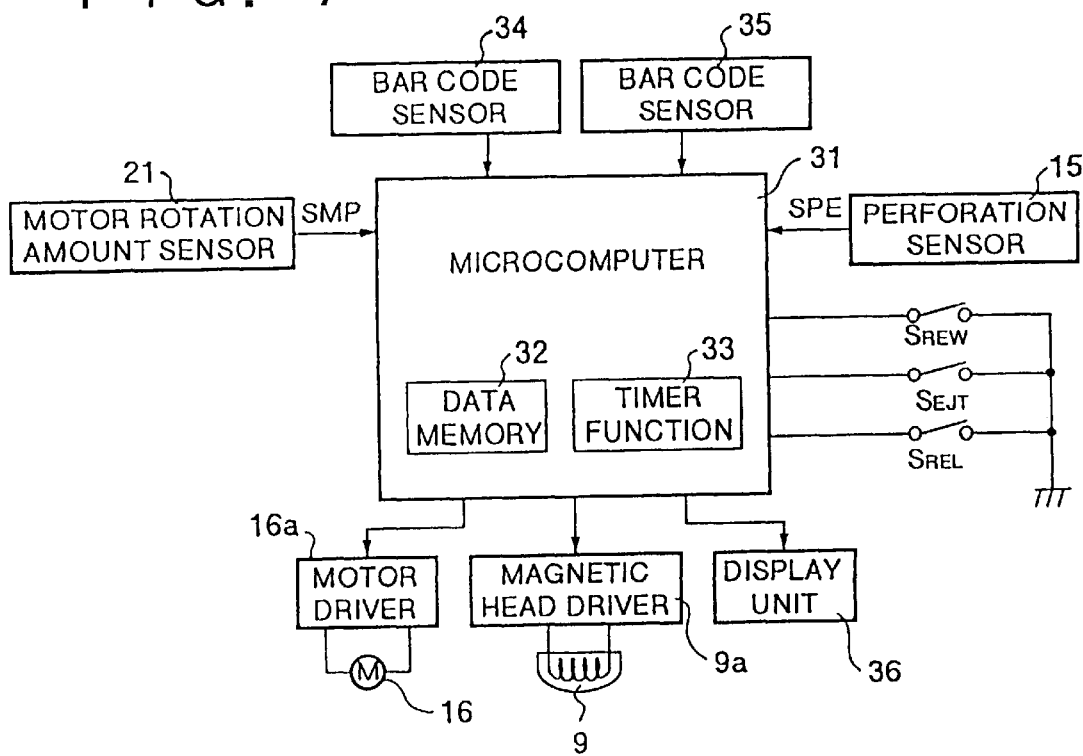
FIG. 7 is a block diagram showing a schematic structure for controlling the camera.

FIG. 7 is a block diagram showing a schematic structure for controlling a camera. A microcomputer 31 controls an overall camera and provides a timer function 32 and a data memory function 33. The microcomputer 31 controls a drive of the feeding motor 16 through the motor driver 16a on receiving a motor pulse SMP from the motor rotation amount sensor 21, a detected signal from the bar code sensors 34 and 35, a perforation signal SPE from the perforation sensor 15, a signal from a halfway rewinding switch SREW, a signal from a switch SEJT for ejecting a cartridge chamber, a signal from a release switch SREL and signals from the other various switches. Further, the microcomputer 31 executes a magnetic recording and reading out by the magnetic head 9 through the magnetic head driver 9a, and it controls so as to indicate data and the like at an indicator unit 36.

Figure 8:
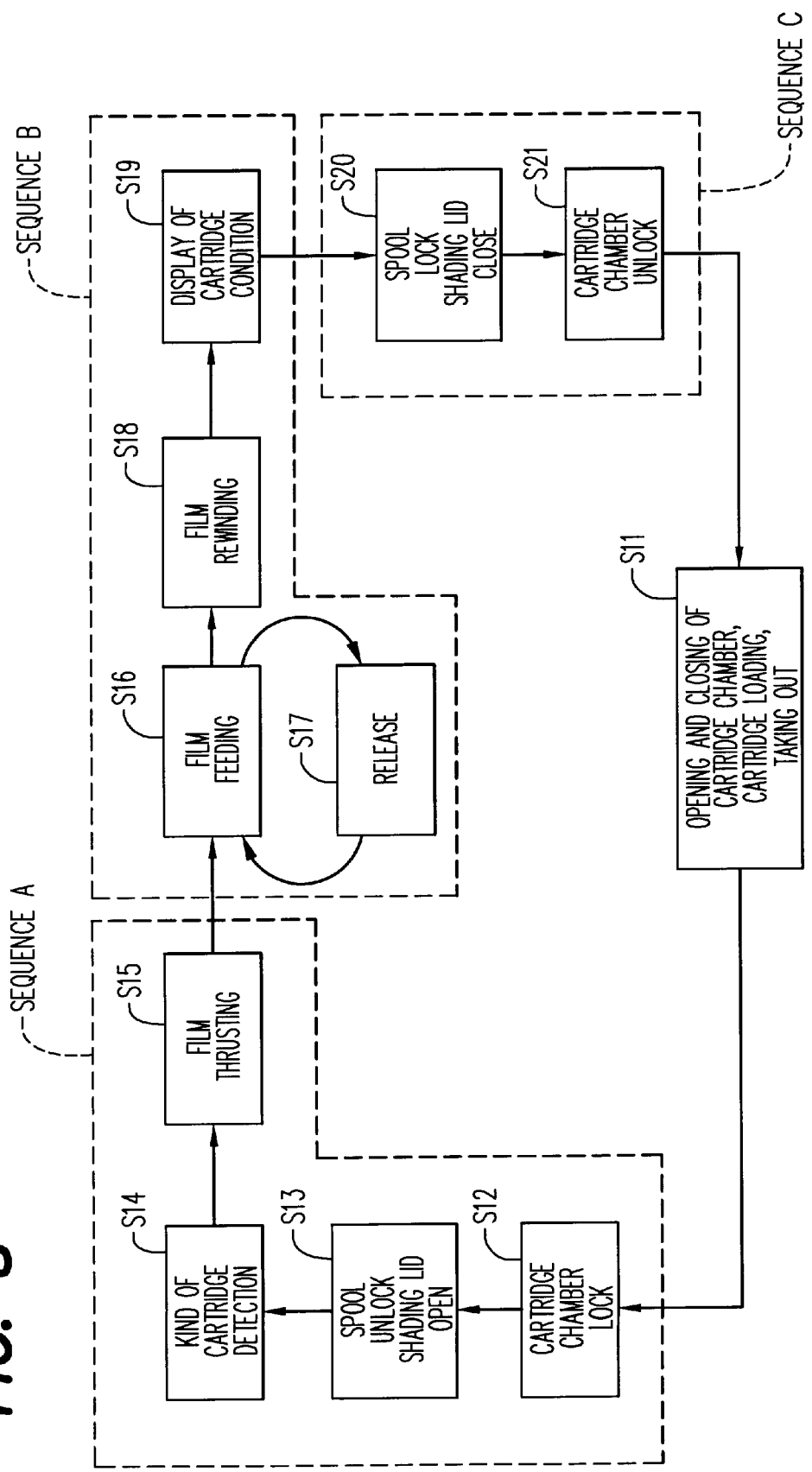
FIG. 8 is a flowchart when a film cartridge is used in a camera, FIGS. 9 (a) to 9 (d) are views showing a state that a lead portion of a film is thrust from a film cartridge and it is conveyed to a winding up spool at film thrusting operation.
Figure 9A:
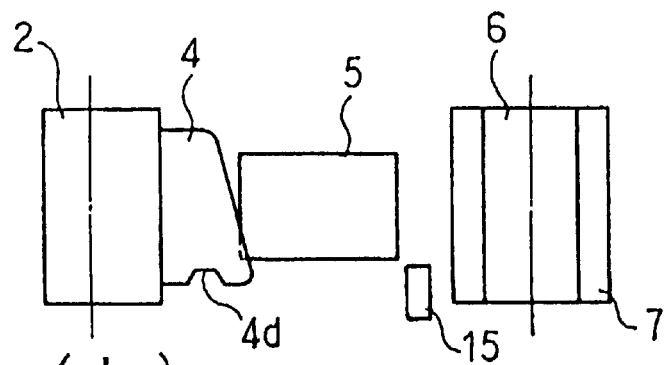
Figure 9B:
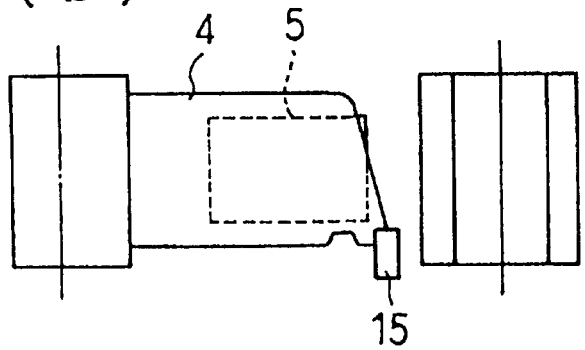
Figure 9C:
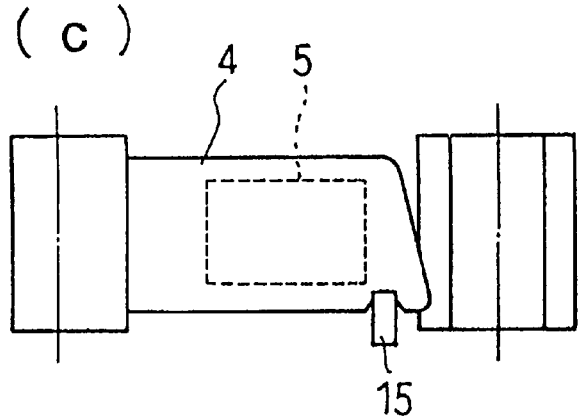
Figure 9D:
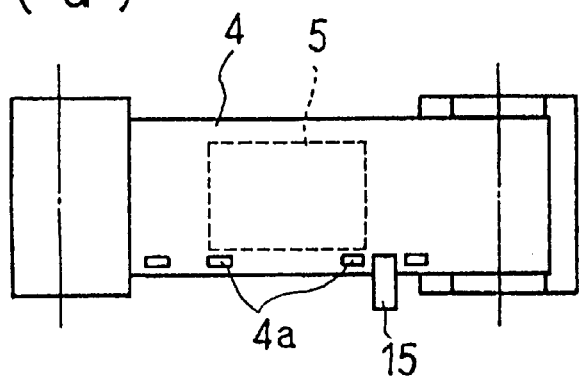

FIG. 8 is a flowchart when a film cartridge is used in a camera. As for an opening and closing of a cartridge chamber of a camera at a step S11 and a loading and taking out of the cartridge, an user executes these operations manually. Steps from S12 to S15 in a sequence A is a sequence executed in a camera after loading a cartridge. A shading lid is disposed at an exit of a film of the film cartridge, and when the shading lid is opened, a locked winding spool is unlocked due to a structure inside the cartridge. As for judgment of a kind of a film at a step S14, it is executed by reading out a bar code. By reading out a cartridge data such as a film sensitivity, a fixed number of film frames, and the like based on decipher of a bar code, and at the same time by detecting an initial phase of the bar code plate (phase before rotation), it is detected whether the film in the cartridge is unexposed, partially exposed, entirely exposed and so on. As for a film thrusting at a step S15, it means that an initial loading is executed such that a lead portion of a film is thrust from the cartridge 2 (FIG. 1) and it is conveyed to the winding spool 6. According to the present embodiment, when there occurs a problem during the film thrusting operation, a relief is provided (details will be explained later).

Further, the present camera is able to use again a film cartridge, wherein the film is rewound at halfway of the film roll, and when a halfway rewinding is executed, an indication "partially exposed" is shown at the indicator of the cartridge. Thus, when a cartridge is used again, since an indication of "partially exposed" is detected at the step S14 for detecting a kind of a film, the film is fed to a position of a first unexposed frame of the film. As a photographing data has been recorded magnetically on the magnetic track 4b (FIG. 3) corresponding to each frame by the magnetic head 9, the feeding to a position of a unexposed frame can be executed by detecting whether a data signal exists or not on the magnetic track 4b.

Steps from S16 to S19 in a sequence B is a sequence of a shutter release, a film winding, and a film rewinding. According to the present embodiment, it provides a relief when a problem occurs during a film winding at the step S16 (details will be explained later). At an indication of the cartridge condition at the step S19, it indicates whether a film is exposed, partially exposed, unexposed and so on in accordance to a position where the winding spool of the cartridge is stopped after executing a film rewinding. Steps S20 and S21 in a sequence C is a sequence of taking out a film cartridge.

Now, as for an initial loading by the film thrusting operation (S15) at the above-mentioned sequence A, it will be explained in detail referring to FIGS. 9 (a) to 9 (d) and FIG. 10. FIG. 9 (a), FIG. 9 (b), FIG. 9 (c), and FIG. 9 (d) show states that a lead portion of a film is thrust from the cartridge 2 and conveyed to the winding spool 6 at the film thrusting operation. Here, a notch 4d is arranged near a lead portion of a film in order to prevent that the film is not be able to be thrust due to a sticking or an idle running when the film contained in a film cartridge completely is thrust. The film also has plural perforations 4a formed along one edge of the film. The notch 4d is located closer to the lead portion of the film than the perforations 4a. Note that the sensor 15 is placed in a location so as to detect the perforations 4a as the perforations pass the detector. Because the lead portion of the film is not yet reliably positioned in a width direction during initial feeding, the sensor 15 may not detect the notch 4d.

Figure 10:
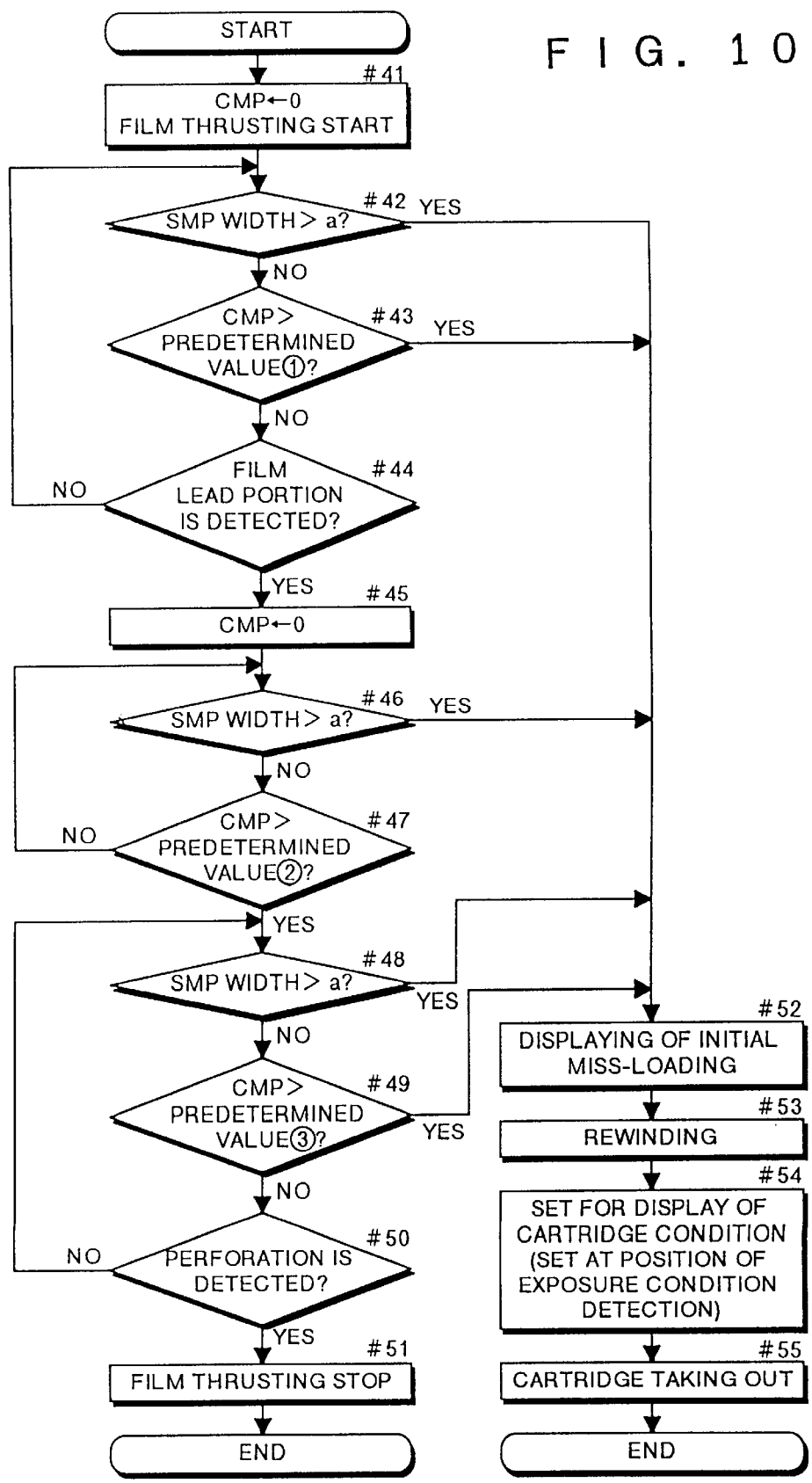
FIG. 10 is a flowchart showing a film thrusting procedure.

FIG. 10 is a flowchart showing a procedure of a film thrusting operation. This procedure is executed when it is detected that a film in a cartridge is unexposed or partially exposed at the detection of the step S14. In the procedure, first of all, it resets the counter CMP for counting a motor pulse SMP to "0", and it starts a film thrusting operation (#41). In the course of the film thrusting operation, a lead portion of film is fed out along with a part of the film following the lead portion. Then, the counter CMP starts calculating an amount of a film feeding until a lead portion of a film is detected. Thereafter, it is detected whether a width of the motor pulse SMP is bigger than a predetermined time (a) (#42). This detection is for judging that the feeding motor 16 is stopped in case that a next trailing edge does not occur even though the predetermined time (a) passed from a trailing edge of the motor pulse SMP (same as an up edge), and when it is judged YES, it means that an initial loading is failed, and then it proceeds to a procedure for treating a failed initial loading after #52. When it is judged No at #42, then, it is judged whether a value of the counter CMP is bigger than a predetermined value [1] or not (#43). This judgment is for judging that an initial film thrusting is failed when a lead portion of a film is not detected regardless of a film thrusting operation more than the predetermined value [1], and if it is judged YES, it means that an initial loading has failed and it proceeds to the procedure for failed initial loading after #52 as same as above. When it is judged No at the judgment of #43, next, it is detected whether a lead portion of a film is detected based on leading edge of signal from the perforation sensor 15 (#44). When the lead portion of a film can not be detected, it returns to #42, and a procedure of a loop of #42 and #43 is executed.

When it is able to detect a lead portion of a film, it executes resetting the counter CMP in order to count an amount of film feeding after passing of the film's lead portion (#45). Then, as same as #42, a detection of a width of the motor pulse SMP is executed (#46), and it is detected whether an initial loading is failed or not due to motor stop. In case that an initial loading is failed, its following procedure is same as above. Next, it is judged whether a value of the counter CMP is bigger than a predetermined value [2] (#47). This judgment is to continue a film thrusting operation not executing a perforation detection during the predetermined value [2] from a lead portion of a film, preventing from mistaking the notch 4d near the lead portion of a film for the perforation 4a. When it is detected NO at the judgment of #47, it returns to #46. It is able to execute the judgment of #47 by judging whether a passed time from resetting the counter CMP at #45 is over a predetermined time.

When it is detected YES at the judgment #47, it is detected again whether a width of the motor pulse SMP (#48) is the same as #42, further, when the perforation 4a is not detected regardless of a film thrusting more than a predetermined value [3] after a lead portion of a film is passed, it is judged that the film thrusting is failed (#49~#50). The detection of the perforation 4a is executed by a trailing edge signal from the perforation sensor 15. When the perforation 4a is detected, a film thrusting operation is stopped (#51). Consequently, a film feeding to a first frame is completed. This first frame represents an earliest frame following the lead portion. Thereafter, it proceeds to a procedure of a shutter release preparation.

In the above-mentioned sequence, an amount of a film feeding is calculated by counting the motor pulse SMP by means of the counter CMP (#43, #49), and it may be calculated by using a read out signal of a bar code from the bar code sensors 34 and 35. As the bar code plate rotates with the winding spool of the cartridge, the read out signal of the bar code plate 12 corresponds to an amount of a film feeding. The same method may be employed in a judgment for problems which occur during a film winding procedure.

When an initial loading is failed, it indicates that the initial loading is failed (#52), then, it executes a film rewinding procedure (FIG. 8, S18) in the sequence B (#53). Further, an indicating condition (stopping phase) of an indicator of the cartridge (bar code plate in FIG. 5) is set (#54). After the procedure of #54, it proceeds to a sequence for taking out of a cartridge (#45), and the procedure is finished. When an initial loading is failed, at setting the cartridge condition indicator (#54), it returns to a same indication (same stopping phase) as a content of judgment of an initial usage condition of a cartridge by a detection of a kind of film cartridge at S14 in the sequence A. As a failing of the initial loading is a problem before entering a main use condition, so it is favorable to return the indicator such as above in order to use a film cartridge effectively.

Figure 11:
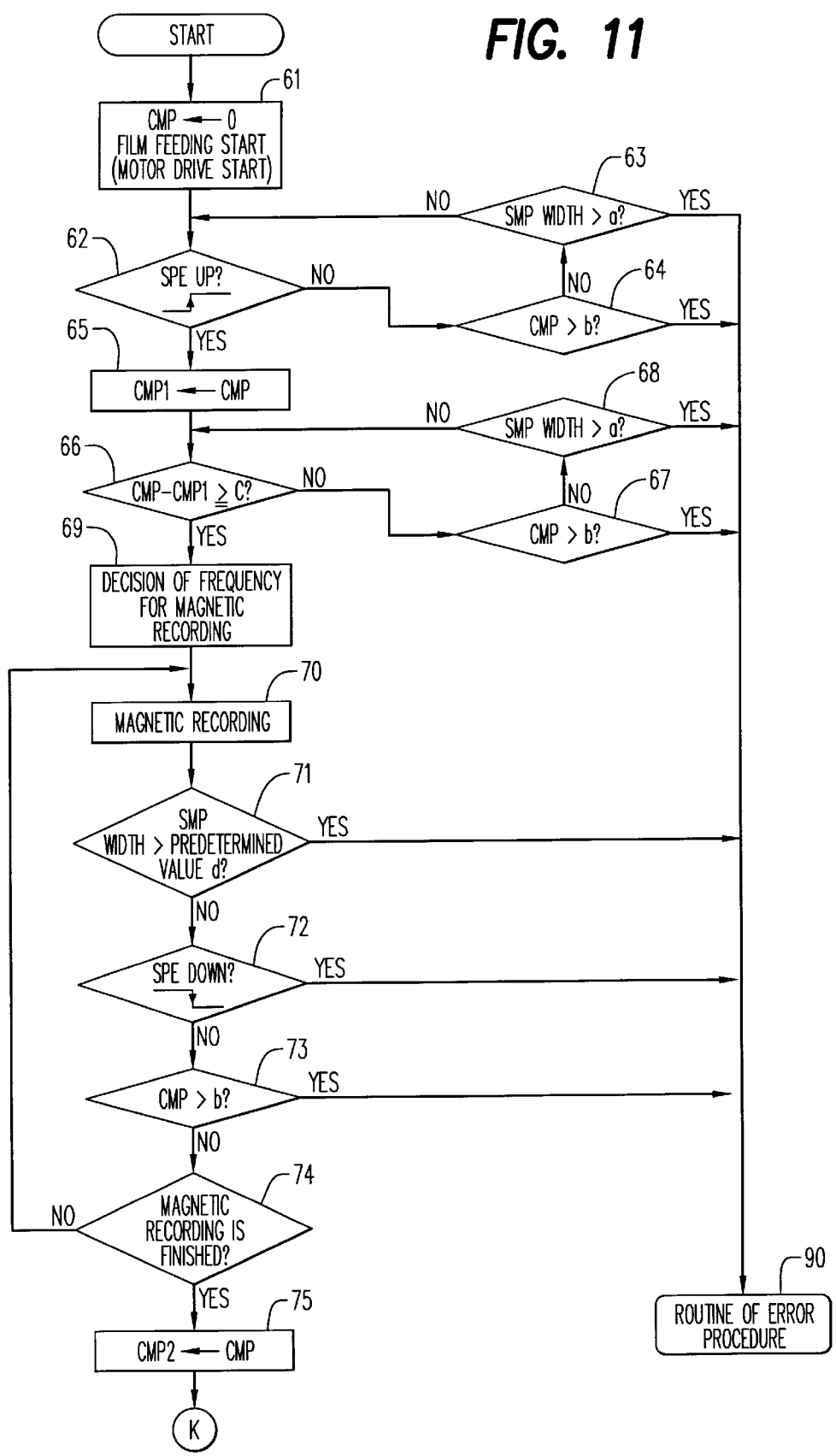
FIG. 11 is a flowchart showing a film winding up procedure.
Figure 12:
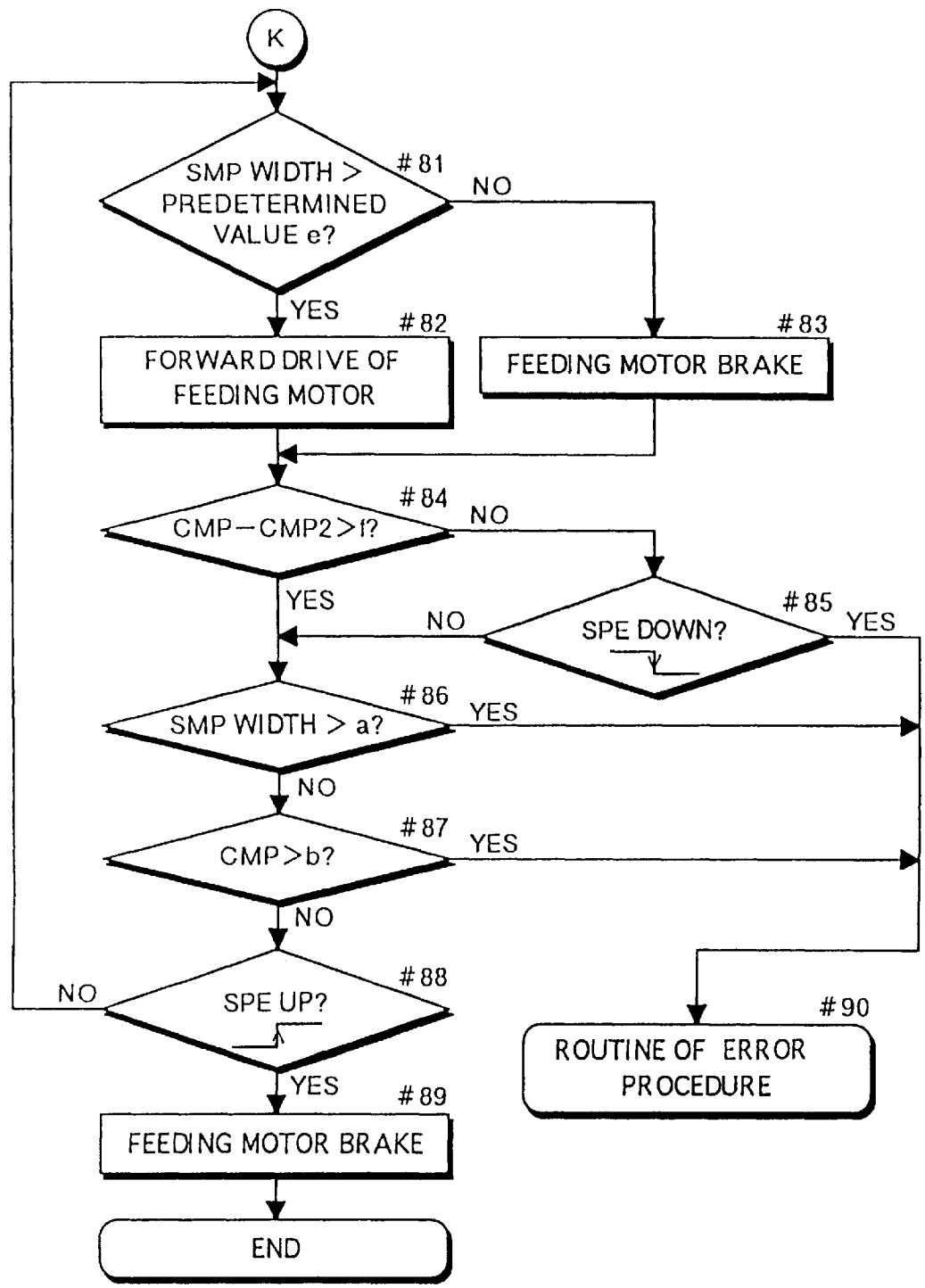
FIG. 12 is a flowchart showing a film rewinding procedure.

Now, a film winding procedure of the sequence B (FIG. 8, S16) will be explained referring to FIG. 11 and FIG. 12. While the film winding procedure is executed, a magnetic recording of a photographing information is executed on a magnetic recording section of each film frame. First of all, the counter CMP for counting a motor pulse SMP is reset to "0" for monitoring a total driving amount of the feeding motor during a winding and then winding is started (#61). Next, in order to decide a starting position of a magnetic recording by a counting number of the motor pulse SMP based on an edge of a first perforation 4a, a leading edge of the perforation signal SPE is detected, and a value of the counter CMP of the motor pulse SMP is memorized in the counter CMP1 (#62, and #65).

If it is judged NO at the judgment of #62, that is, until the leading edge of the perforation signal SPE is detected, it is judged whether a value of the counter CMP becomes bigger than a predetermined value (b) (#64). This is for judging as a breakdown of a winding system when the winding operation can not be finished even though a motor is driven by an efficient driving amount for winding one frame (setting pulse (b) in a number of the motor pulse SMP previously). When it is judged YES at #64, it proceeds to a routine of #90 treating the breakdown. When it is judged NO at #64, it is judged whether a width of the motor pulse SMP becomes bigger than a time (a) which has been set up previously (#63). This is for judging that the feeding motor is stopped when a next trailing edge never occurs even when the predetermined time (a) has passed from a trailing edge of the motor pulse SMP (same in case of leading edge).

After the step #65, it is detected whether a difference of a value of the counter CMP and a value of the counter CMP1 becomes bigger than a predetermined value (c) (#66). It is for starting a magnetic recording when the film is wound by the predetermined pulse (c) of the motor pulse SMP from an edge of a first perforation 4a. The predetermined pulse (c) is set up previously so as to correspond to "n" in FIG. 6. When it is judged NO at the step #66, it executes the same procedure of a breakdown detection similar to #64 and #63 (#67 and #68). When it is detected YES at the judgment of #66, a winding speed is detected from a width of the motor pulse SMP just before a magnetic recording or a signal width of a first perforation signal SPE, a frequency for magnetic recording is decided, and a magnetic recording is executed (#69, #70). Then, it is judged whether a time width of the motor pulse SMP is bigger than a previously determined value (d) or not (#71), and when it is bigger than the predetermined value, it is judged that the feeding speed is too low to execute a stable magnetic recording, and it proceeds to a procedure of #90 for treating a breakdown. Since a relation of the value (a) and (d) is a>d, it does not need to judge whether a time width of the motor pulse SMP is bigger than the value (a). Next, in case that a second perforation signal SPE is detected before a completion of magnetic recording, it is judged that the magnetic recording is executed over a scope for one frame, and it proceeds to a procedure of #90 for treating a breakdown (#72).

If the second perforation signal SPE is not detected, it is judged whether a value of the counter CMP becomes bigger than the predetermined value (b) (#73) same as the step #64, and if there is no abnormality, it is detected whether a magnetic recording is finished or not (#74). Until a necessary data to be recorded is input, a loop from step #70 to step #74 is repeated, and when the magnetic recording is completed, a counted number of the motor pulse SMP at the time when the magnetic recording is completed, is memorized in the counter CMP2 (#75) in order to confirm whether all data have been recorded within a scope of magnetic recording by means of film winding amount (counted value of the motor pulse SMP) until a trailing edge of the perforation signal SPE.

Thereafter, the feeding motor 16 is braked in two steps until a film feeding is stopped. In accordance to a speed Vc of a regular speed winding, which is executed between the first brake and the second one, a time (e) is set up previously, and it is judged whether a width of the motor pulse SMP is bigger than the predetermined value (e) (#81). When it is judged as the winding speed≦Vc as a result, it continues a forward drive of the motor in a winding direction (#82). When it is judged as the winding speed>Vc, a motor brake is done (#83). As for this brake, it is a short brake or a reverse drive brake (a first brake and a brake for a regular speed winding). Furthermore, when a feeding amount until a trailing edge of the second perforation signal SPE is under a predetermined value (f) of a counted value of the motor pulse SMP, it is judged that it is over a scope of magnetic recording, and then it proceeds to a procedure of #90 for treating a breakdown (#84, #85). Further, it is judged whether a width of the motor pulse SMP is not bigger than the predetermined value (a), whether a value of the counter CMP is not bigger than the predetermined value (b) (#86, #87) same as #64 and #63, and if there is an abnormality, it proceeds to a procedure of #90 for treating a breakdown, but if there is not any abnormality, it returns to the step #81 and repeats the same procedure until a leading edge of the second perforation signal SPE is detected (#88). When the leading edge of the signal SPE is detected, the second brake is put (#89), the film feeding is stopped, and the procedure is finished. This brake also may be a short brake or a reverse drive brake. As explained before, a read out signal of a bar code may be employed substituting for counting the motor pulse SMP (counter CMP) at #64, #67, #73, and #87 in the above sequences.

Figure 13:
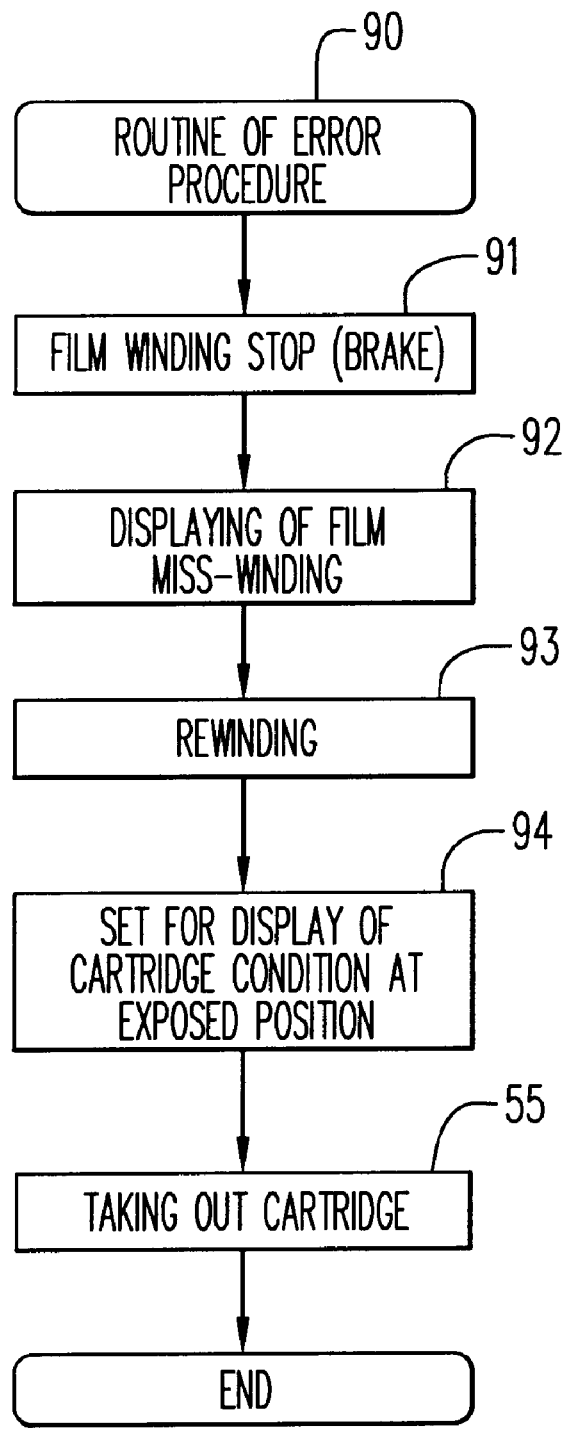
FIG. 13 is a view showing a routine for treating a trouble during a film winding up.

Now, a routine of #90 for treating a breakdown procedure during a film winding will be explained referring to FIG. 13. When it enters the procedure, the feeding motor is put on a brake, and the feeding is stopped (#91). Then, it indicates that the feeding is failed (#92), a rewinding operation is executed (#93). This is same as the above-mentioned rewinding operation (#53) when an initial loading is failed at a film feeding operation. Thereafter, a cartridge condition indication (stop phase) by the indicator of a cartridge (bar code plate 12) is set to an exposed position (#94). As a breakdown occurs due to a stopping motor and an abnormal recording during a film feeding, there is a possibility that a magnetic recording is poor. Accordingly, it is favorable to set it at "exposed" because there is a possibility that an exposed frame is judged to be an unexposed frame on re-using it when "partially exposed" is indicated in order to enable to detect an unexposed frame by whether magnetic signal exists or not.

In addition, there is a method such that a winding sequence is executed once again by rewinding a film once to an original starting position for winding when an abnormality is detected. However, since a film feeding position is detected based on the perforation as explained above, for example, if the film feeding is stopped at edge portion of the perforation accidentally in an abnormal stopping, it is likely to produce a false signal due to movement of the edge of the perforation because the film is swayed forward and backward with a slight vibration at resuming an operation, and there is a high possibility to misunderstand an accurate film feeding position. Accordingly, it is more favorable to set the cartridge condition indicator at "exposed" after rewinding the film, not executing a false sequence again.

Moreover, although the present invention is applied to a camera in the above-mentioned embodiment, it may be employed to various kinds of apparatus such as a photo-finishing device, a film scanner and the like, not being limited within a camera. While the above-mentioned example shows a case of employing a film cartridge containing a film in which magnetic recording is executed, it may be also employed to a film cartridge containing a film in which optical recording is executed.

What is claimed is:

1. An apparatus capable of using a film cartridge containing a lead portion of a film, the film also having plural perforations formed along one edge of the film and a notch cut in said one edge adjacent to said lead portion, wherein the notch is positioned closer to the film's lead portion than the perforations, wherein the apparatus comprises:
    a film feeder which feeds the film out of the film cartridge;
    a detector which detects said perforations as said perforations pass the detector; and,
    a controller which inhibits the detector from detecting perforations for a predetermined time for allowing the notch to pass through the detector following the detection of the lead portion being fed out of the cartridge.

2. The apparatus as claimed in claim 1, wherein the controller controls the film feeding by the film feeder in response to a detected result of the detector.

3. The apparatus as claimed in claim 2, wherein the controller stops the film feeder from feeding the film when the perforation is not detected by the detector after a lapse of a second predetermined time which is longer than the first predetermined time.

4. The apparatus as claimed in claim 3, wherein the film feeder comprises a driving motor, and the second predetermined time is detected by detecting a driving amount of the driving motor.

5. The apparatus as claimed in claim 4, wherein the controller also stops the film feeder from feeding the film when the controller detects that a driving speed of the motor is reduced.

6. The apparatus as claimed in claim 1, wherein the film feeder comprises a driving motor, and the predetermined time is detected by detecting a driving amount of the driving motor.

7. The apparatus as claimed in claim 6, wherein the controller stops the film feeder from feeding the film when the controller detects that a driving speed of the motor is reduced.

8. The apparatus as claimed in claim 7, wherein the controller detects that a driving speed of the motor is reduced by measuring the width of a pulse generated by said driving motor.

9. The apparatus as claimed in claim 6, wherein the predetermined time is detected by the controller by counting pulses generated by said driving motor.

10. The apparatus as claimed in claim 1, wherein the apparatus is a camera.

11. The apparatus as claimed in claim 1, wherein the detector detects both the perforations and the lead portion of the film.

12. An apparatus capable of using a film cartridge containing a film which has a perforation corresponding to a photographing frame, and a notch near a lead portion, wherein the lead portion of the film is initially contained in the film cartridges, wherein the apparatus comprises:
    a film feeder which feeds a film out of a film cartridge, wherein the film feeder feeds out the lead portion of the film and a part of the film following the lead portion;
    a detector which detects a perforation formed on the film in order to detect positioning of the fed film, wherein the detector detects a perforation of the film fed out of the cartridge to determine the completion of the feeding of the part following the lead portion of the film; and,
    a controller which stops the detector from detecting the perforation for a predetermined time from a time that the lead portion of the film is fed out of the film cartridge, and stops the feeding of the film out of the cartridge in response to the detection of the perforation indicating an earliest frame following the lead portion after a lapse of the predetermined time.

13. The apparatus as claimed in claim 12, wherein the controller stops the film feeder from thrusting and rewinds the film when the detector does not detect a perforation when a second predetermined time passes after a lapse of the predetermined time.

14. The apparatus as claimed in claim 13, wherein the film feeder comprises a driving motor, and the first and second predetermined time is also detected by detecting a driving amount of the driving motor.

15. The apparatus as claimed in claim 14, wherein the predetermined time is detected by the controller by counting pulses generated by said driving motor.

16. The apparatus as claimed in claim 14, wherein the controller also stops the film feeder from feeding, and rewinds the film when the controller detects that a driving speed of the motor is reduced.

17. The apparatus as claimed in claim 16, wherein the controller detects that a driving speed of the motor is reduced by measuring the width of a pulse generated by said driving motor.

18. The apparatus as claimed in claim 12, wherein the apparatus is a camera.

19. The apparatus as claimed in claim 12, wherein the detector detects both the perforations and the lead portion of the film.

20. An apparatus capable of using a film cartridge containing a film which has a perforation corresponding to a photographing frame, and a notch near a lead portion, wherein the apparatus comprises:
    a film feeder which feeds the film out of the film cartridge;
    a detector which detects the lead portion of the film and a perforation formed on the film in order to detect positioning of the fed film; and,
    a controller which operates the detection of the detector in order to detect the lead portion of the film for a first predetermined time from a time that the lead portion of the film is fed out of the film cartridge, and then stops the detector from detecting for a second predetermined time after a lapse of the first predetermined time, and then operates the detector in order to detect the perforation after a lapse of the second predetermined time.

21. The apparatus as claimed in claim 20, wherein the controller stops the film feeder from feeding when the lead portion of the film is not detected after a lapse of the first predetermined time.

22. The apparatus as claimed in claim 20, wherein the controller stops the film feeder from feeding when the perforation is not detected when a third predetermined time passes after a lapse of the second predetermined time.

23. The apparatus as claimed in claim 20, wherein the film feeder has a driving motor, and the first and second predetermined times are detected by detecting a driving amount of the driving motor.

24. The apparatus as claimed in claim 23, wherein the first and second predetermined times are detected by the controller by counting pulses generated by said driving motor.

25. The apparatus as claimed in claim 20, wherein the apparatus is a camera.

26. An apparatus capable of using a film cartridge containing a lead portion of a film, wherein the apparatus comprises:
   a film feeder which feeds the film out of the film cartridge;
   a detector which detects a perforation formed on the film in order to detect positioning of the fed film and which also detects the lead portion of the film;
   a driving motor; and,
   a controller including a timing means for determining an elapsed amount of time on the basis of the operation of the driving motor, wherein said controller:
      determines whether the lead portion has been detected within a first predetermined time, and if the lead portion has been detected within the first predetermined time, resets said timing means, and if the lead portion has not been detected within the first predetermined time, provides an indication of a miss-loaded film cartridge;
      upon resetting of said timing means after detection of the lead portion, waits until a second period of time has transpired, during which said detector is disabled, to allow a notch in the film to pass said detector undetected;
      after said second period of time has transpired, determines whether a perforation has been detected within a third predetermined time, and if the perforation has been detected within the third predetermined time, stops a film thrusting operation, and if the perforation has not been detected within the third predetermined time, provides an indication of a miss-loaded film cartridge.

27. The apparatus as claimed in claim 26, wherein said driving motor generates pulses, and wherein said timing means determines an elapsed amount of time by counting the pulses.

28. The apparatus as claimed in claim 27, wherein said controller periodically determines whether a width of any pulse has exceeded a predetermined value, and if so, provides an indication of film miss-loading.

29. An apparatus capable of using a film cartridge containing a lead portion of a film, wherein the apparatus comprises:
   film feeder which feeds the film out of the film cartridge;
   a detector which detects a perforation formed on the film in order to detect positioning of the fed film; and
   a controller which stops the detector from detecting the perforation for a predetermined time in response to the detector detecting a lead portion of the film.

30. An apparatus capable of using a film cartridge containing a lead portion of a film, wherein the apparatus comprises:
   a film feeder which feeds the film out of the film cartridge;
   a detector which detects a perforation formed on the film in order to detect positioning of the fed film; and
   a controller which controls the detector to resume detecting perforations after a lapse of predetermined time in response to the detector detecting a lead portion of the film.

* * * * *